(12) United States Patent
Isozaki et al.

(10) Patent No.: US 12,189,794 B2
(45) Date of Patent: Jan. 7, 2025

(54) INFORMATION PROCESSING APPARATUS, INFORMATION PROCESSING SYSTEM, AND NON-TRANSITORY COMPUTER READABLE MEDIUM FOR CONTROLLING OUTPUT OF VOICE SEGMENTS IN ACCORDANCE WITH SECURITY LEVEL

(71) Applicant: FUJIFILM Business Innovation Corp., Tokyo (JP)

(72) Inventors: Jun Isozaki, Kanagawa (JP); Satoshi Tatsuura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 442 days.

(21) Appl. No.: 17/543,689

(22) Filed: Dec. 6, 2021

(65) Prior Publication Data

US 2023/0059611 A1 Feb. 23, 2023

(30) Foreign Application Priority Data

Aug. 19, 2021 (JP) .................................. 2021-134070

(51) Int. Cl.
| | |
|---|---|
| *G06F 21/60* | (2013.01) |
| *G06F 21/62* | (2013.01) |
| *G10L 15/02* | (2006.01) |
| *G10L 15/04* | (2013.01) |
| *G10L 15/22* | (2006.01) |
| *G10L 15/26* | (2006.01) |

(52) U.S. Cl.
CPC ............ *G06F 21/604* (2013.01); *G06F 21/62* (2013.01); *G10L 15/02* (2013.01); *G10L 15/04* (2013.01); *G10L 15/22* (2013.01); *G10L 15/26* (2013.01); *G06F 2221/2113* (2013.01); *G10L 2015/025* (2013.01)

(58) Field of Classification Search
CPC ......... G06F 21/604; G06F 21/62; G10L 15/02
See application file for complete search history.

(56) References Cited

U.S. PATENT DOCUMENTS

| | | | | |
|---|---|---|---|---|
| 4,538,234 A | * | 8/1985 | Honda | H04B 1/667 704/229 |
| 4,998,279 A | * | 3/1991 | Weiss | G07C 9/215 235/382 |
| 8,577,684 B2 | | 11/2013 | Lee et al. | |
| 8,954,332 B2 | | 2/2015 | Lee et al. | |
| 9,881,604 B2 | | 1/2018 | Lee et al. | |
| 9,954,803 B1 | * | 4/2018 | Kominar | H04L 51/10 |
| 10,446,134 B2 | | 10/2019 | Lee et al. | |
| 10,867,065 B2 | * | 12/2020 | Ren | H04L 51/04 |
| 2003/0125928 A1 | * | 7/2003 | Lee | G06F 40/47 704/4 |

(Continued)

FOREIGN PATENT DOCUMENTS

JP 2009501942 1/2009

*Primary Examiner* — Jason Chiang
(74) *Attorney, Agent, or Firm* — JCIPRNET

(57) ABSTRACT

An information processing apparatus includes a processor configured to: segment, into multiple voice segments, voice data and text data converted from the voice data; impart a security level to each of the voice segments in accordance with contents of the text data and the voice data in each of the voice segments; and perform control on an output of each of the voice segments in accordance with the security level.

14 Claims, 17 Drawing Sheets

(56) References Cited

U.S. PATENT DOCUMENTS

| | | | |
|---|---|---|---|
| 2005/0271246 A1* | 12/2005 | Sharma | G06Q 20/3823 713/168 |
| 2006/0217964 A1* | 9/2006 | Kamatani | G06F 40/55 704/7 |
| 2007/0067852 A1* | 3/2007 | James | G06F 21/84 726/28 |
| 2009/0222450 A1* | 9/2009 | Zigelman | H04L 51/00 |
| 2012/0054838 A1* | 3/2012 | Kim | H04L 63/10 726/4 |
| 2012/0185653 A1* | 7/2012 | Peters | G06F 16/28 711/E12.092 |
| 2014/0355069 A1* | 12/2014 | Caton | H04N 1/00883 382/100 |
| 2015/0331847 A1* | 11/2015 | Jung | G06F 16/3341 707/739 |
| 2017/0034554 A1* | 2/2017 | Tang | H04N 21/2747 |
| 2017/0040002 A1* | 2/2017 | Basson | G09G 5/373 |
| 2017/0199867 A1* | 7/2017 | Koji | G06F 40/35 |
| 2017/0358317 A1* | 12/2017 | James | G10L 25/48 |
| 2018/0197094 A1* | 7/2018 | Lee | G06F 18/217 |
| 2018/0246588 A1* | 8/2018 | Bostick | G06F 3/0482 |
| 2019/0066686 A1* | 2/2019 | Baracaldo Angel | G10L 21/0208 |
| 2019/0370283 A1* | 12/2019 | Church | G06N 3/08 |
| 2020/0065514 A1* | 2/2020 | Keen | G10L 19/018 |
| 2020/0327149 A1* | 10/2020 | Brennenstuhl | G06F 16/2365 |
| 2020/0374269 A1* | 11/2020 | Lidman | H04L 63/10 |
| 2020/0380147 A1* | 12/2020 | Kurian | H04L 63/20 |
| 2020/0380579 A1* | 12/2020 | Burris | G10L 15/1815 |
| 2021/0120053 A1* | 4/2021 | Shin | H04L 67/1068 |
| 2021/0208842 A1* | 7/2021 | Cassidy | G11B 27/28 |
| 2022/0130392 A1* | 4/2022 | Ko | H04M 1/72412 |
| 2022/0239655 A1* | 7/2022 | Viswanathan | H04L 63/105 |
| 2023/0059611 A1* | 2/2023 | Isozaki | G10L 15/02 |
| 2023/0140480 A1* | 5/2023 | Narimatsu | G06F 40/56 704/9 |
| 2023/0153451 A1* | 5/2023 | Malhotra | G06F 21/6245 726/26 |

* cited by examiner

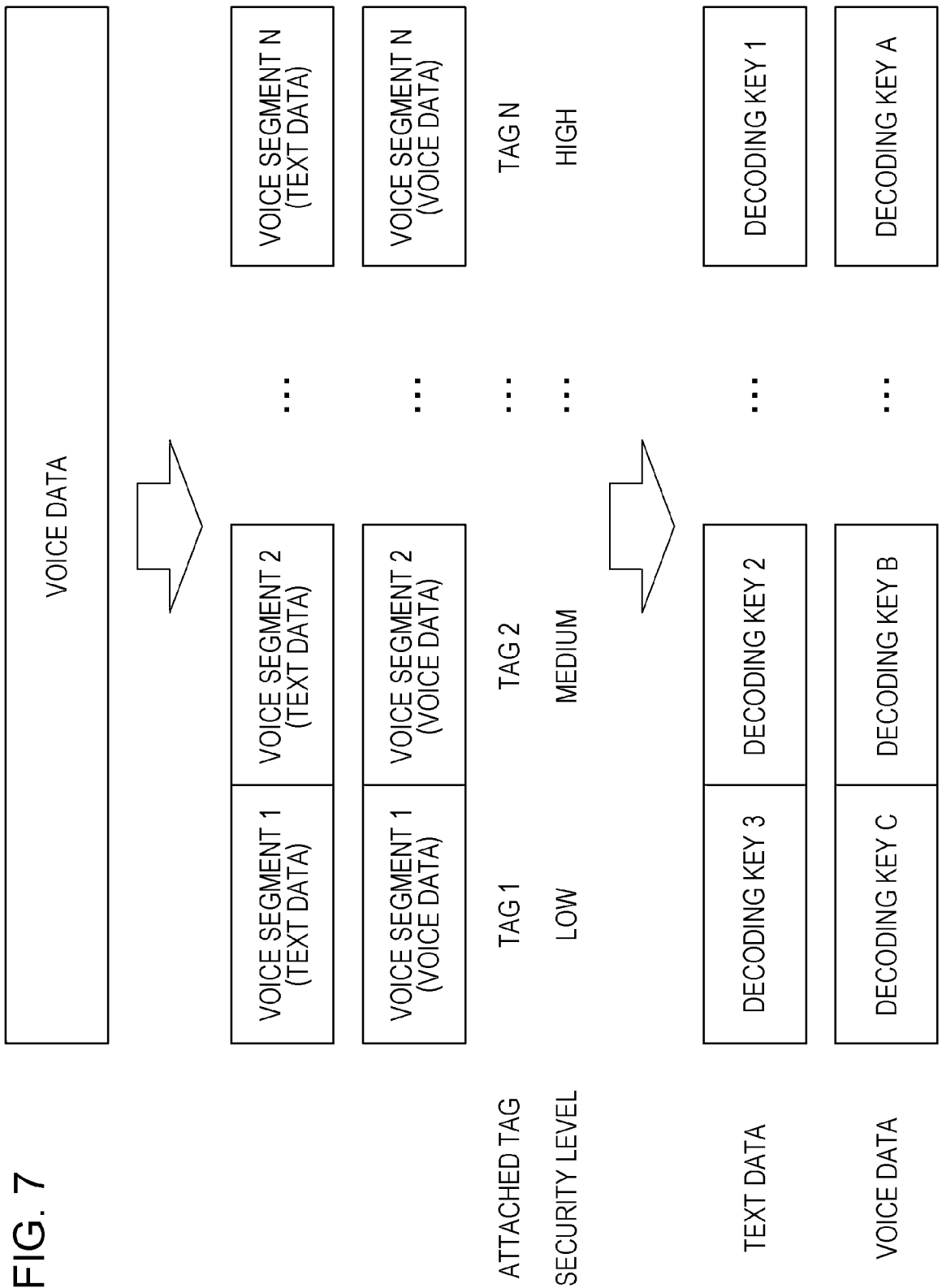

FIG. 8

| CONTENTS OF TEXT DATA, ETC. | TAG INFORMATION | SECURITY LEVEL | EXAMPLE OF MEETING |
|---|---|---|---|
| DATE, VENUE, PARTICIPANTS, AGENDA, ETC. | MEETING INFORMATION | LOW | ALL MEETINGS |
| SALES, OPERATION PROFIT, M & A INFORMATION, ETC. | MANAGEMENT INFORMATION | HIGH | MANAGEMENT MEETING, ETC. |
| PERSON TO BE EVALUATED IN TERMS OF HUMAN RESOURCES, PERFORMANCE REVIEW, PLACE OF APPOINTMENT, ETC. | PERSONNEL INFORMATION | HIGH | MANAGEMENT MEETING, DEPARTMENT MANAGEMENT MEETING, ETC. |
| PRODUCT NAME, DEVELOPMENT CODE, MARKET INTRODUCTION TIME, COSTS, ETC. | PRODUCT INFORMATION | HIGH | PRODUCT PLANNING MEETING, DEVELOPMENT PROPOSAL MEETING, DESIGN REVIEW, ETC. |
| SALES DESTINATION, SCALE OF SALE, DELIVERY SCHEDULE, ETC. | SALES INFORMATION | HIGH | SALES MEETING |
| PERSONAL NAME, BIRTHDAY, ADDRESS, ETC. | PERSONAL INFORMATION | HIGH | PERSONNEL MEETING, ETC. |
| SUBJECT | SUBJECT | MEDIUM | ALL MEETINGS |
| ACTION ITEM, PERSON IN CHARGE, DELIVERY, ETC. | ToDo | MEDIUM | ALL MEETINGS |

FIG. 9A

| ACCESSOR | VIEW PERMISSION LEVEL | ATTACHED DECODING KEY |
|---|---|---|
| M1 | HIGH | TEXT DATA: 1/2/3 VOICE DATA: A/B/C |
| M2 | MEDIUM | TEXT DATA: 2/3 VOICE DATA: B/C |
| M3 | LOW | TEXT DATA: 3 VOICE DATA: C |

FIG. 9B

| | TEXT DATA/VOICE DATA AT LOW SECURITY LEVEL | TEXT DATA/VOICE DATA AT MEDIUM SECURITY LEVEL | TEXT DATA/VOICE DATA AT HIGH SECURITY LEVEL |
|---|---|---|---|
| M1 HIGH VIEW PERMISSION LEVEL | VIEWABLE | VIEWABLE | VIEWABLE |
| M2 MEDIUM VIEW PERMISSION LEVEL | VIEWABLE | VIEWABLE | UNVIEWABLE |
| M3 LOW VIEW PERMISSION LEVEL | VIEWABLE | UNVIEWABLE | UNVIEWABLE |

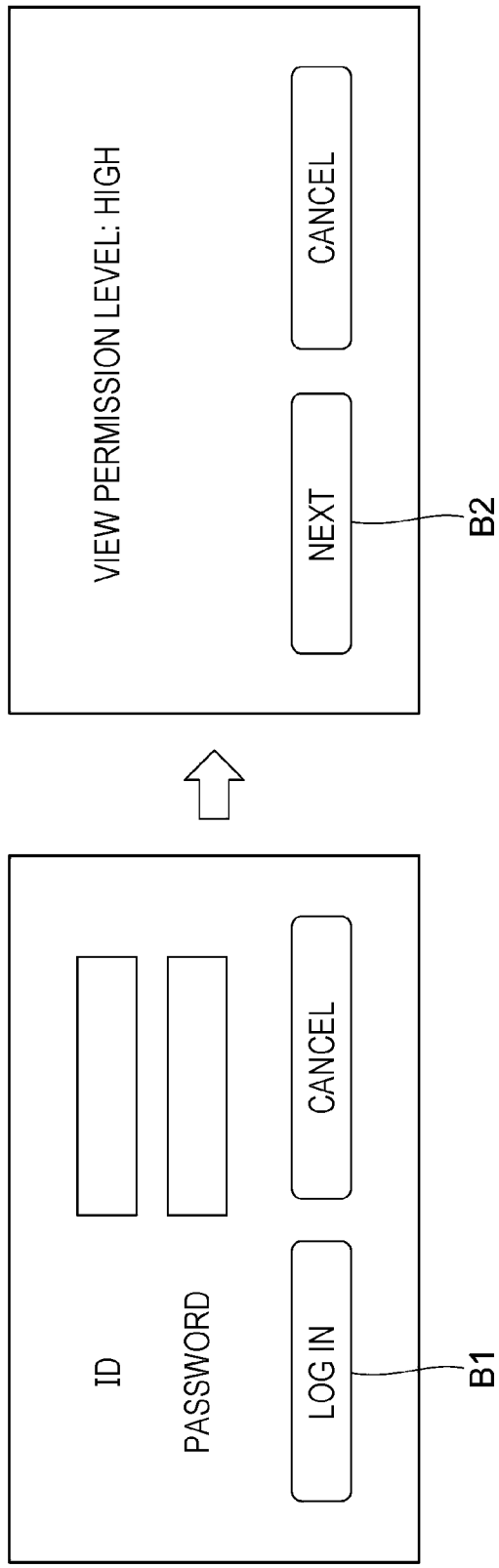

FIG. 11

PLEASE, SELECT MEETING
YOU WANT TO VIEW.

SEARCH BY KEYWORD [ ] 🔍

| NAME OF MEETING ⬥ | DATE ⬥ | VENUE ⬥ | PARTICIPANTS ⬥ | |
|---|---|---|---|---|
| DESIGN REVIEW OF PRODUCT X | 1/12/2021 | MEETING ROOM B IN OFFICE A | TANAKA, SATOH, AND 10 OTHER PERSONS | VIEW — B5 |
| PROPOSAL OF DEVELOPMENT START OF PRODUCT Y | 1/18/2021 | MEETING ROOM C IN HEAD OFFICE | SUZUKI, MORI AND 8 OTHER PERSONS | VIEW — B5 |
| ... | ... | ... | ... | |
| MEETING ON PROBLEM OF PRODUCT Z IN MARKET | 1/18/2021 | MEETING ROOM D IN OFFICE A | YAMADA, TAKAHASHI, AND 7 OTHER PERSONS | VIEW — B5 |

[PREVIOUS PAGE] — B3
[NEXT PAGE] — B4

FIG. 12

| NAME OF MEETING | DESIGN REVIEW OF PRODUCT X |
|---|---|
| DATE | 1/12/2021 |

SEARCH BY KEYWORD [    ] 🔍

| SECURITY LEVEL | TIME FROM START | TEXT DATA | VOICE DATA |
|---|---|---|---|
| LOW | 0:00:00 TO 0:01:23 | TODAY IS JANUARY 12, 2021. VENUE IS MEETING ROOM B, OFFICE A. PARTICIPANTS ARE TANAKA, SATOH,... | PLAYBACK |
| HIGH | 0:01:23 TO 0:02:34 | SINCE HIGH STRENGTH IS REQUIRED OF ELEMENT C, MATERIAL D IS SELECTED, AND COSTS ARE TARGETED AT E YENS. | PLAYBACK |
| MEDIUM | 0:02:34 TO 0:03:45 | TO MR. F, PLEASE STUDY MORE ON ISSUE G AND SUBMIT A REPORT BY NEXT WEDNESDAY. | PLAYBACK |

[PREVIOUS PAGE] — B6
[NEXT PAGE] — B7
PLAYBACK — B8

FIG. 13

| NAME OF MEETING | DESIGN REVIEW OF PRODUCT X |
| DATE | 1/12/2021 |

SEARCH BY KEYWORD

| SECURITY LEVEL | TIME FROM START | TEXT DATA | VOICE DATA |
|---|---|---|---|
| LOW | 0:00:00 TO 0:01:23 | TODAY IS JANUARY 12, 2021. VENUE IS MEETING ROOM B, OFFICE A. PARTICIPANTS ARE TANAKA, SATOH,... | PLAYBACK |
| HIGH | 0:01:23 TO 0:02:34 | | PLAYBACK |
| MEDIUM | 0:02:34 TO 0:03:45 | TO MR. F. PLEASE STUDY MORE ON ISSUE G AND SUBMIT A REPORT BY NEXT WEDNESDAY. | PLAYBACK |

PREVIOUS PAGE    NEXT PAGE

FIG. 14

| NAME OF MEETING | DESIGN REVIEW OF PRODUCT X | | |
|---|---|---|---|
| DATE | 1/12/2021 | | |

SEARCH BY KEYWORD [ ] 🔍

| SECURITY LEVEL | TIME FROM START | TEXT DATA | VOICE DATA |
|---|---|---|---|
| LOW | 0:00:00 TO 0:01:23 | TODAY IS JANUARY 12, 2021. VENUE IS MEETING ROOM B, OFFICE A. PARTICIPANTS ARE TANAKA, SATOH,... | PLAYBACK |
| HIGH | 0:01:23 TO 0:02:34 | SINCE HIGH STRENGTH IS REQUIRED OF ELEMENT C, ▨▨▨ IS SELECTED, AND COSTS ARE TARGETED AT ▨▨▨. | PLAYBACK |
| MEDIUM | 0:02:34 TO 0:03:45 | TO MR. F. PLEASE STUDY MORE ON ISSUE G AND SUBMIT A REPORT BY NEXT WEDNESDAY. | PLAYBACK |

[PREVIOUS PAGE] — B6

[NEXT PAGE] — B7

B8 (PLAYBACK buttons)

FIG. 15

| CONTENTS OF TEXT DATA, ETC. | TAG INFORMATION | SECURITY LEVEL | DISCLOSURE DESTINATION RANGE | EXAMPLE OF MEETING |
|---|---|---|---|---|
| DATE, VENUE, PARTICIPANTS, AGENDA, ETC. | MEETING INFORMATION | LOW | ALL | ALL MEETINGS |
| SALES, OPERATION PROFIT, M & A INFORMATION, ETC. | MANAGEMENT INFORMATION | HIGH | BOARD MEMBERS | MANAGEMENT MEETING, ETC. |
| PERSON TO BE EVALUATED IN TERMS OF HUMAN RESOURCES, PERFORMANCE REVIEW, PLACE OF APPOINTMENT, ETC. | PERSONNEL INFORMATION | HIGH | ALL MEMBERS OF PERSONNEL DEPARTMENT AND MEMBERS OF DEPARTMENT OPERATION | MANAGEMENT MEETING, DEPARTMENT MANAGEMENT MEETING, ETC. |
| PRODUCT NAME, DEVELOPMENT CODE, MARKET INTRODUCTION TIME, COSTS, ETC. | PRODUCT INFORMATION | HIGH | ALL MEMBERS OF DESIGN DEPARTMENT | PRODUCT PLANNING MEETING, DEVELOPMENT PROPOSAL MEETING, DESIGN REVIEW, ETC. |
| SALES DESTINATION, SCALE OF SALE, DELIVERY SCHEDULE, ETC. | SALES INFORMATION | HIGH | ALL MEMBERS OF SALES DEPARTMENT | SALES MEETING |
| PERSONAL NAME, BIRTHDAY, ADDRESS, ETC. | PERSONAL INFORMATION | HIGH | ALL MEMBERS OF PERSONNEL DEPARTMENT AND BOARD MEMBERS | PERSONNEL MEETING, ETC. |
| SUBJECT | SUBJECT | MEDIUM | ALL | ALL MEETINGS |
| ACTION ITEM, PERSON IN CHARGE, DELIVERY, ETC. | ToDo | MEDIUM | ALL | ALL MEETINGS |

FIG. 16

| ACCESSOR | VIEW PERMISSION LEVEL | DEPARTMENT | POST |
|---|---|---|---|
| M1 | HIGH | DESIGN DEPARTMENT | MANAGER |
| M2 | MEDIUM | PERSONNEL DEPARTMENT | GENERAL STAFF |
| M3 | LOW | SALES DEPARTMENT | GENERAL STAFF |
| M4 | HIGH | LABORATORY | DIRECTOR OF LABORATORY |

| CONTENTS OF TEXT DATA, ETC. | TAG INFORMATION | SECURITY LEVEL | DISCLOSED TO | NON-DISCLOSURE TIME PERIOD | EXAMPLE OF MEETING |
|---|---|---|---|---|---|
| DATE, VENUE, PARTICIPANTS, AGENDA, ETC. | MEETING INFORMATION | LOW | ALL | NOT APPLICABLE | ALL MEETINGS |
| SALES, OPERATION PROFIT, M & A INFORMATION, ETC. | MANAGEMENT INFORMATION | HIGH | BOARD MEMBERS | 2 YEARS | MANAGEMENT MEETING, ETC. |
| PERSON TO BE EVALUATED IN TERMS OF HUMAN RESOURCES, PERFORMANCE REVIEW, PLACE OF APPOINTMENT, ETC. | PERSONNEL INFORMATION | HIGH | ALL MEMBERS OF PERSONNEL DEPARTMENT AND MEMBERS OF DEPARTMENT OPERATION | 3 YEARS | MANAGEMENT MEETING, DEPARTMENT MANAGEMENT MEETING, ETC. |
| PRODUCT NAME, DEVELOPMENT CODE, MARKET INTRODUCTION TIME, COSTS, ETC. | PRODUCT INFORMATION | HIGH | ALL MEMBERS OF DESIGN DEPARTMENT | 2 YEARS | PRODUCT PLANNING MEETING, DEVELOPMENT PROPOSAL MEETING, DESIGN REVIEW, ETC. |
| SALES DESTINATION, SCALE OF SALE, DELIVERY SCHEDULE, ETC. | SALES INFORMATION | HIGH | ALL MEMBERS OF SALES DEPARTMENT | 1 YEAR | SALES MEETING |
| PERSONAL NAME, BIRTHDAY, ADDRESS, ETC. | PERSONAL INFORMATION | HIGH | ALL MEMBERS OF PERSONNEL DEPARTMENT AND BOARD MEMBERS | INDEFINITE PERIOD | PERSONNEL MEETING, ETC. |
| SUBJECT | SUBJECT | MEDIUM | ALL | NOT APPLICABLE | ALL MEETINGS |
| ACTION ITEM, PERSON IN CHARGE, DELIVERY, ETC. | ToDo | MEDIUM | ALL | 1 YEAR | ALL MEETINGS |

INFORMATION PROCESSING APPARATUS, INFORMATION PROCESSING SYSTEM, AND NON-TRANSITORY COMPUTER READABLE MEDIUM FOR CONTROLLING OUTPUT OF VOICE SEGMENTS IN ACCORDANCE WITH SECURITY LEVEL

CROSS-REFERENCE TO RELATED APPLICATIONS

This application is based on and claims priority under 35 USC 119 from Japanese Patent Application No. 2021-134070 filed Aug. 19, 2021.

BACKGROUND

(i) Technical Field

The present disclosure relates to an information processing apparatus, information processing system, and non-transitory computer readable medium.

(ii) Related Art

When a meeting is held in an organization, such as a company, minutes of the meeting are typically stored in a shared folder in the form of voice data or text data. The data on the minutes may include confidential information and access to the data on the minutes is permitted, in many cases without any restriction. This is problematic from the standpoint of security protection. Currently available to protect the data may be a technique of coding the data on the minutes and granting specific persons access to the data and a technique of rendering segments including personal information unclear and outputting the unclear data as disclosed in Japanese Translation of PCT Application Publication No. 2009-501942.

During a meeting, however, a discussion of an issue that is to be widely shared in a company may be interrupted by a discussion of personnel affairs including personal information or a discussion of confidential matters related to a management decision. In this way, multiple types of contents different in confidentiality may be discussed in no particular order in a single meeting. It is not practical to restrict access to data on minutes of a meeting on a per meeting basis.

SUMMARY

Aspects of non-limiting embodiments of the present disclosure relate to performing security protection of contents of minutes of a meeting in a more practical way than when data on the minutes is protected on a per meeting basis.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: segment, into multiple voice segments, voice data and text data converted from the voice data; impart a security level to each of the voice segments in accordance with contents of the text data and the voice data in each of the voice segments; and perform control on an output of each of the voice segments in accordance with the security level.

BRIEF DESCRIPTION OF THE DRAWINGS

Exemplary embodiment of the present disclosure will be described in detail based on the following figures, wherein:

FIG. 7 illustrates a concept into which voice data serving as a coding target of the management server is visualized;

FIG. 8 illustrates a specific example in which a security level is imparted to each voice segment;

FIG. 9A illustrates a specific example of a view permission level that is imparted to each user, and FIG. 9B illustrates a specific example of a security level imparted to each voice segment;

FIG. 10 illustrates a specific example of a login screen from among screens displayed on a display of the client terminal;

FIG. 11 illustrates a specific example of a meeting selection screen from among the screens displayed on the display of the client terminal;

FIG. 12 illustrates a specific example of a meeting selection screen from among the screens displayed on the display of the client terminal held by a user having a high view permission level;

FIG. 13 illustrates a specific example of a meeting selection screen from among the screens displayed on the display of the client terminal held by a user having a medium view permission level;

FIG. 14 illustrates a specific example of a meeting selection screen from among the screens displayed on the display of the client terminal held by a user having a medium view permission level;

FIG. 15 illustrates a specific example of a disclosure destination range of each voice segment;

FIG. 16 illustrates an organization that a user belongs to and a role that is provided to the user; and FIG. 17 illustrates a specific example of a non-disclosure time period imparted to each voice segment.

DETAILED DESCRIPTION

Embodiment of the disclosure is described in detail with reference to the drawings.

Configuration of Information Processing System

Figure 1:
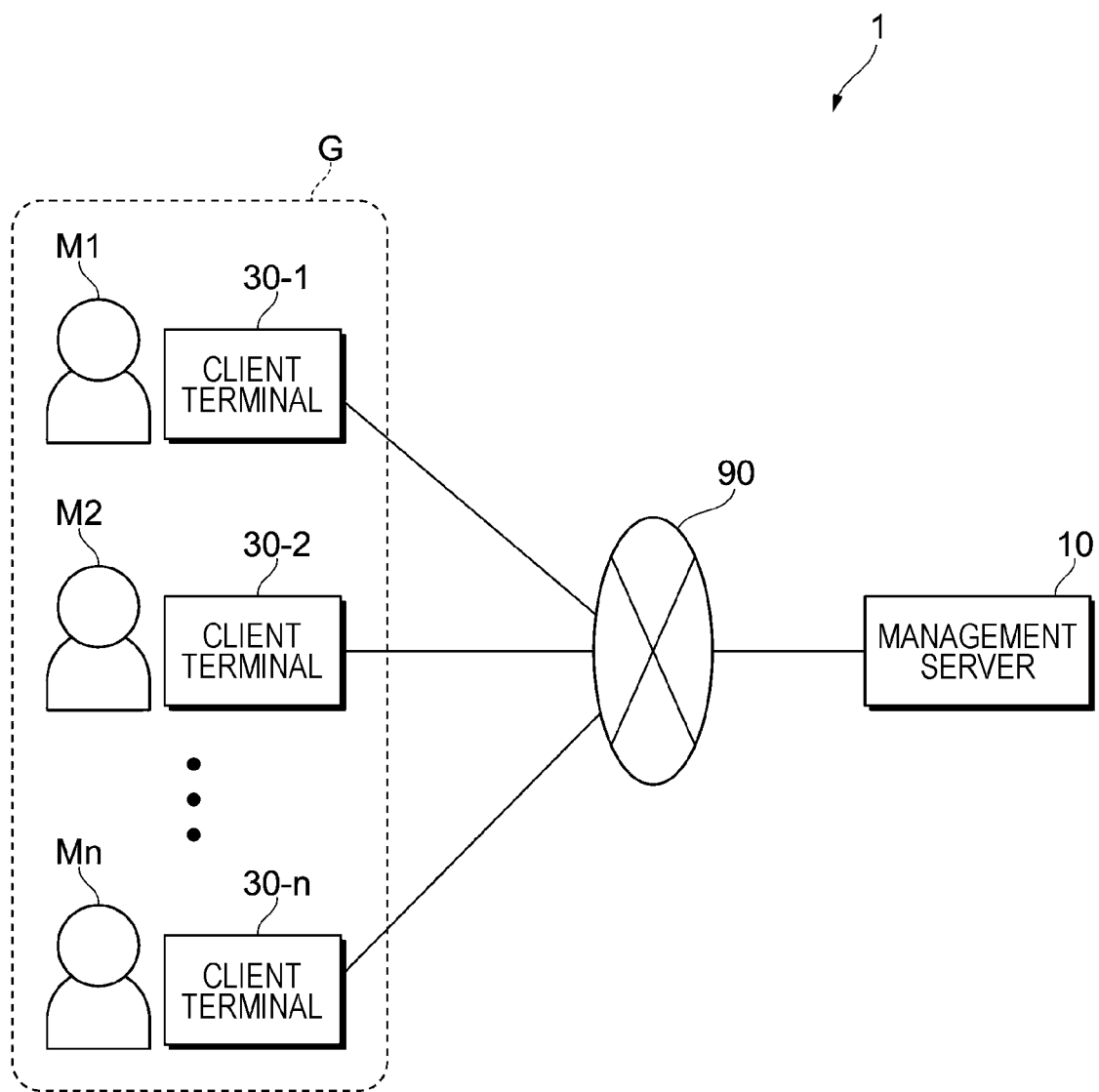
FIG. 1 illustrates a system configuration of an information processing system of an exemplary embodiment.

FIG. 1 illustrates a configuration of an information processing system 1 of an exemplary embodiment. The information processing system 1 includes a management server 10 and client terminals 30-1 through 30-n (n is an integer equal to or above 2) interconnected to each other via a network 90. The network 90 may include a local-area network (LAN), the Internet, or the like.

The management server 10 is an information processing apparatus serving as a server that manages the whole information processing system 1. The management server 10 segments text data converted from voice data into multiple voice segments and imparts a security level to each of the voice segments in accordance with contents of the text data and voice data in each voice segment. The "security level" is an index indicative of a degree of confidentiality of information. According to the exemplary embodiment, the security levels, "high," "medium," and "low" are respectively imparted to the voice segments. By coding or decoding the text data and voice data in the voice segment, the outputting of the text data and voice data in the voice segment is controlled.

Each of the client terminals 30-1 through 30-n is an information processing apparatus, such as a smart phone, personal computer, or tablet terminal, used by each of users M1 through Mn as members of an organization G, such as a company. For example, each of the client terminals 30-1 through 30-n records voices at a meeting and transmits the voice data to the management server 10. Each of the client terminals 30-1 through 30-n accesses the management server 10 to receive the text data and voice data. Each of the client terminals 30-1 through 30-n, if not discriminated from each other, is referred to as a terminal 30. Each of the users M1 through Mn, if not discriminated from each other, is referred to as a user M.

The client terminals 30-1 through 30-n may be individually respectively used by the users M1 through Mn. Alternatively, one terminal 30 may be shared by multiple users M. For example, an external microphone connected to the client terminal 30-1 of the user M1 may be installed in a meeting room to record the meeting of the users M1 through M5.

Hardware Configuration of Management Server

Figure 2:
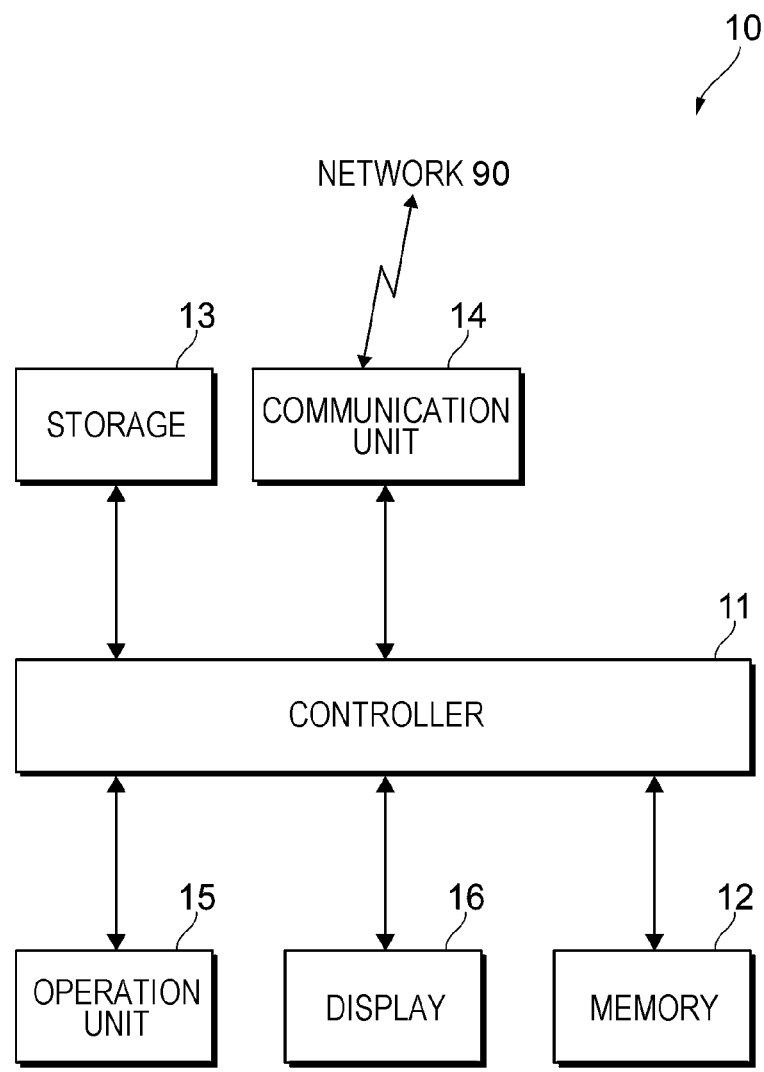
FIG. 2 illustrates a hardware configuration of a management server.

FIG. 2 illustrates a hardware configuration of the management server 10. The management server 10 includes a controller 11, memory 12, storage 13, communication unit 14, operation unit 15, and display 16. These elements are interconnected to each other via a peripheral component interconnect (PCI) bus or the like.

The controller 11 is a processor that controls the operation of the management server 10 by executing an operating system (OS) and application software. For example, the controller 11 includes a central processing unit (CPU). The memory 12 is a memory region that stores data used to execute a variety of software and is thus used as a working area in arithmetic operations. For example, the memory 12 may be a random-access memory (RAM).

The storage 13 stores data input to and data output from the variety of software and includes a database storing a variety of information. For example, the storage 13 is used to store programs and a variety of setting data and is a hard disk drive (HDD), solid-state drive (SSD), or semiconductor memory. The communication unit 14 transmits and/or receives data via the network 90. The communication unit 14 transmits data to and/or receives data from the client terminal 30.

The operation unit 15 includes, for example, a keyboard, mouse, mechanical button, and switch and receives an input operation. The operation unit 15 includes a touch sensor into which the display 16 and a touch panel are integrated. The display 16 displays an image, text information, and the like. The display 16 includes, for example, a liquid-crystal display or organic electroluminescent (EL) display, each used to display information.

Hardware Configuration of Client Terminal

Figure 3:
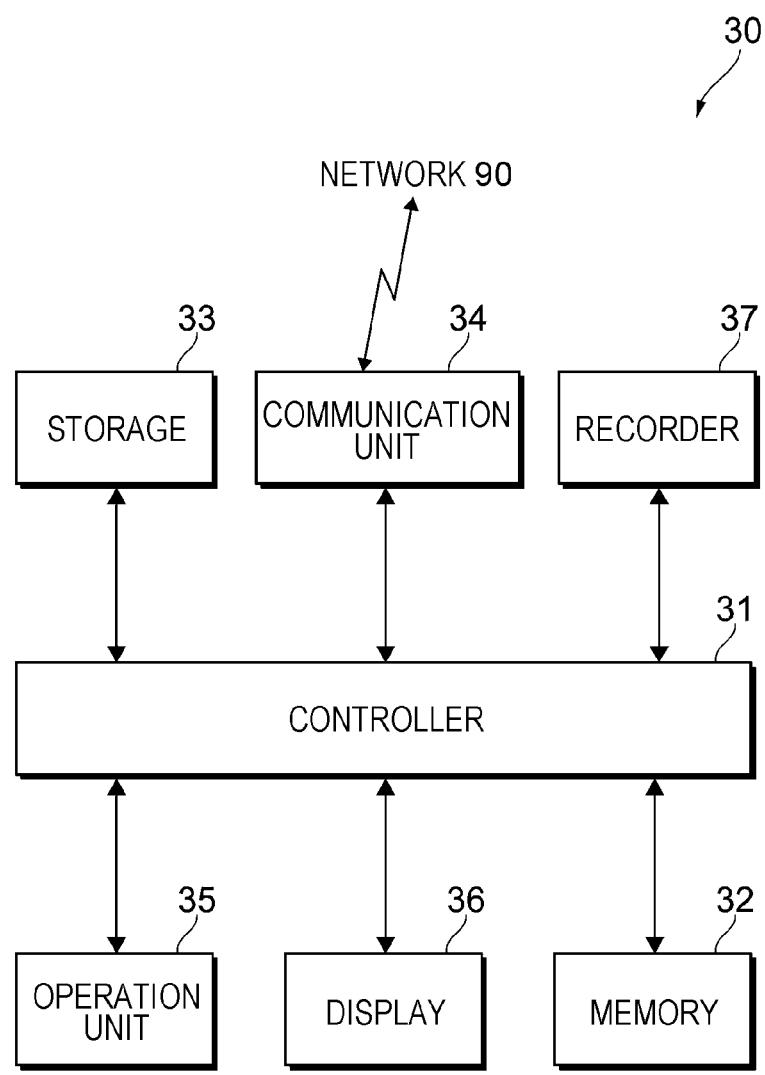
FIG. 3 illustrates a hardware configuration of a client terminal.

FIG. 3 illustrates a hardware configuration of the client terminal 30. The client terminal 30 excluding the recorder 37 used to record voice is identical in hardware configuration to the management server 10 in FIG. 2. Specifically, the client terminal 30 includes a controller 31 including a processor, such as a CPU, memory 32 including a memory region, such as a RAM, and storage 33, including a memory region, such as the HDD or SSD. The client terminal 30 further includes a communication unit 34 transmitting data to and/or receiving data from the management server 10 via the network 90, and operation unit 35 including a keyboard, mouse, touch panel, and the like. The client terminal 30 further includes a display 36, including a liquid-crystal display or organic electroluminescent display. These elements are interconnected to each other via a data bus, address bus, and/or PCI bus.

Functional Configuration of Controller in Management Server

Figure 4:
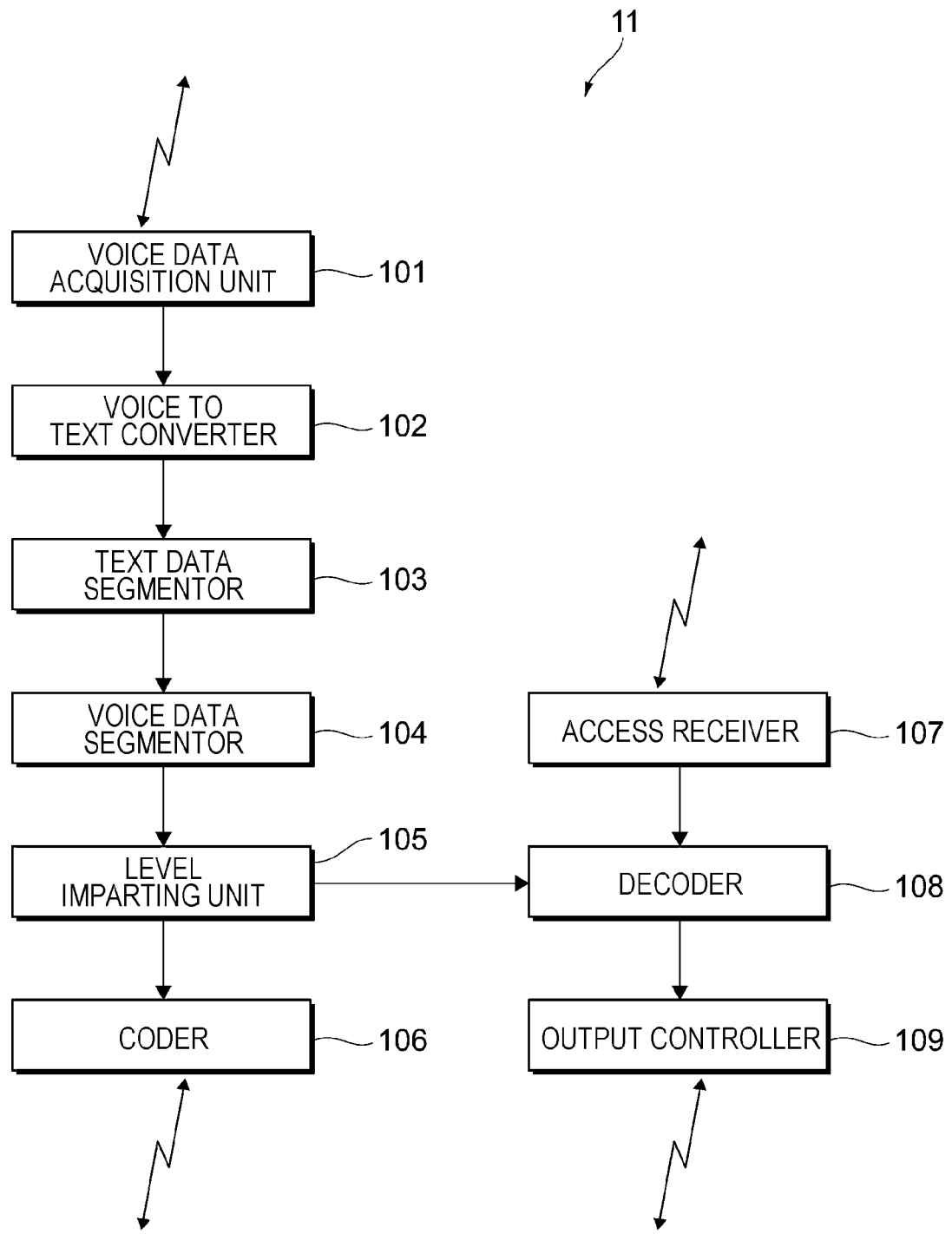
FIG. 4 illustrates a functional configuration of a controller in the management server.

FIG. 4 illustrates a functional configuration of the controller 11 in the management server 10. The controller 11 includes a voice data acquisition unit 101, voice to text converter 102, text data segmentor 103, voice data segmentor 104, level imparting unit 105, coder 106, access receiver 107, decoder 108, and output controller 109.

The voice data acquisition unit 101 acquires voice data transmitted from the client terminal 30. The voice data acquired by the voice data acquisition unit 101 is associated with information related to time. For this reason, time elapsed from a record start may be identified according morpheme units. The voice data acquired by the voice data acquisition unit 101 is stored on the database in the storage 13.

The voice to text converter 102 converts the voice data acquired by the voice data acquisition unit 101 into text. Specifically, the voice to text converter 102 generates text data by performing voice recognition on the voice data acquired by the voice data acquisition unit 101. For example, the voice recognition is based on a technique of recognizing data as a word by extracting feature values of a voice, such as strength, frequency, and intervals of the voice, and calculating an alignment rate of the feature value with models of phonemes and words pre-stored on the database. The text data generated by the voice to text converter 102 is associated with voice data before the conversion and is stored on the database of the storage 13.

The text data segmentor 103 segments the text data generated by the voice to text converter 102 into multiple contexts. Each segmented context is referred as a voice segment. Techniques of segmenting the text data into multiple voice segments include segmenting the text data, by setting a threshold on the number of characters of the text data and a threshold on time of the text data, by using machine learning through artificial intelligence (AI), or by using natural language processing.

In response to the segmentation results of the text data segmentor 103, the voice data segmentor 104 segments, into multiple voice segments, pre-text voice data that is before the conversion performed by the voice to text converter 102. Specifically, the voice data segmentor 104 segments the voice data into the voice segments by cutting the voice data into slices in accordance with a start time and end time of each of the voice segments as the text data. The text data and voice data are associated with each other in the same voice segment.

In place of the segmentation results of the text data or in supplement to the segmentation results of the text data, the voice data segmentor 104 directly segments the voice data into multiple voice segments. For example, a change of subjects that have emitted voices is estimated from a change in features of the voices obtained from the voice data and the voice data is segmented into voice segments in accordance with the estimation results.

Differences in the features of voices of the users M1 through M5 having participated in a meeting are recognized from the voice data of the meeting and a subject having spoken may be estimated from among the users M1 through M5. If the voice data is directly segmented into multiple voice segments independent of the segmentation results of the text data, adjustment may be performed with the segmentation results of the text data. As a result, the text data and voice data are associated with each other in the same voice segment.

The level imparting unit 105 imparts a security level to each of the voice segments in accordance with contents of the text data and voice data in each of the voice segments. According to the exemplary embodiment, "high," "medium," and "low" are imparted in the high to low security level. The level imparting unit 105 may impart beforehand the security level to tag information that is attached to the text data and voice data in accordance with the type of contents of the text data and voice data in the voice segment.

The type of the text data and voice data in the voice segment is identified by the type of each of morphemes forming the text data and voice data in the voice segment. For example, the morpheme is a proper noun or a numerical value. In this way, the security level is automatically imparted by only identifying the tag information of the voice segment. A specific example of the tag information is described with reference to FIGS. 7 and 8.

In response to the security level imparted to each voice segment by the level imparting unit 105, the coder 106 codes the text data and voice data in each of the voice segments. The text data and voice data in each of the voice segments coded by the coder 106 are associated with a decoding key on a per security level basis. The decoding key is used to decode data in a viewable form. In this way, the outputting of the voice data may be controlled according to the voice segment forming the voice data. A specific example of coding each of the voice segments is described with reference to FIG. 7.

The coder 106 may code each of morphemes forming the voice segment. In this case, a decoding key used to decode data for viewability is associated on a per security basis with the text data and voice data including multiple morphemes coded by the coder 106. The outputting of each morpheme forming the voice segment may be controlled. A specific example of coding each of the morphemes forming the voice segment is described with reference to FIG. 14.

The access receiver 107 receives access from the client terminal 30 with respect to the text data and voice data stored on the database in the storage 13. In accordance with a view permission level imparted beforehand to the accessing user M of the client terminal 30 and the security level imparted to each voice segment, the decoder 108 grants the user M the decoding key, thereby causing the text data and voice data in the corresponding voice segment to be viewable.

According to the exemplary embodiment, the imparted security levels are "high," "medium," and "low." A user M who is imparted with the high view permission security level is granted the decoding key that permits to be viewable all the voice segments of the coded text data and voice data. A user M who is imparted with the medium view permission security level is granted the decoding key that permits to be viewable the voice segments at the medium and low security levels out of the voice segments of the coded text data and voice data. A user M who is imparted with the low view permission security level is granted the decoding key that permits to be viewable the voice segments at the low security levels out of the voice segments of the coded text data and voice data.

The decoder 108 grants the user M the decoding key according to a predetermined range of users M. Specifically, the decoder 108 grants the user M the decoding key in accordance with an organization that the user M belongs to and/or a role that is provided to the user M. In this way, the text data and voice data in the corresponding voice segment are viewable. A specific example of granting the user M the decoding key in accordance with the predetermined range of the users M is described below with reference to FIGS. 15 and 16.

The decoder 108 grants the user M the decoding key in accordance with a predetermine time period. Specifically, when a predetermined non-disclosure time period for each piece of tag information has elapsed, the decoding key may be granted to all the users M. A specific example of the predetermined non-disclosure time period for each piece of the tag information is described below with reference to FIG. 17.

The output controller 109 performs control to cause the display 16 to display the text data and voice data that are coded or decoded on a per voice segment basis or on a per morpheme basis. Specifically, when the user M that is granted the decoding key has accessed, the output controller 109 performs control such that the text data and/or the voice data in the voice segment corresponding to the decoding key is output. A specific example of the text data and voice data displayed on the display 16 in the client terminal 30 is described with reference to FIGS. 12 through 14.

Process Performed by Management Server

Figure 5:
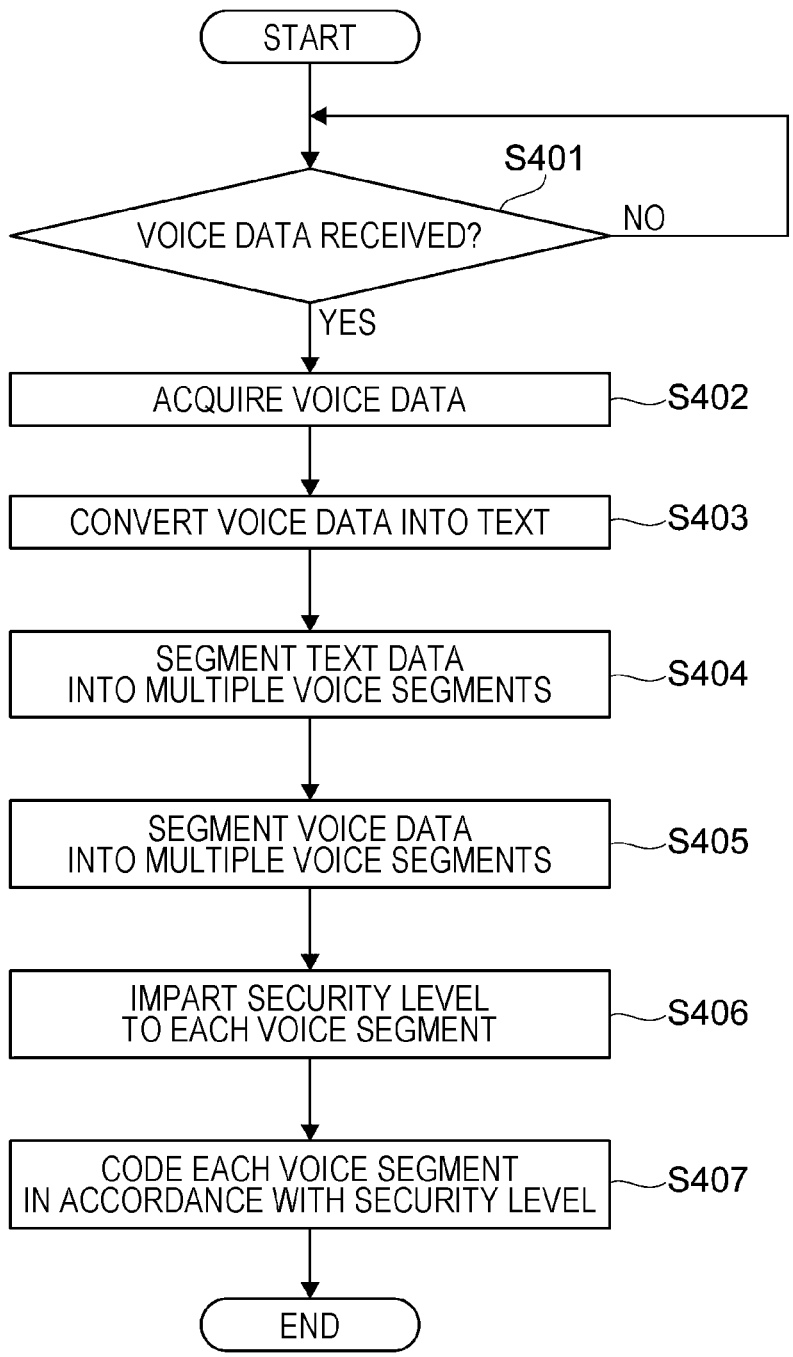
FIG. 5 is a flowchart illustrating a process flow of coding performed by the management server.
Figure 6:
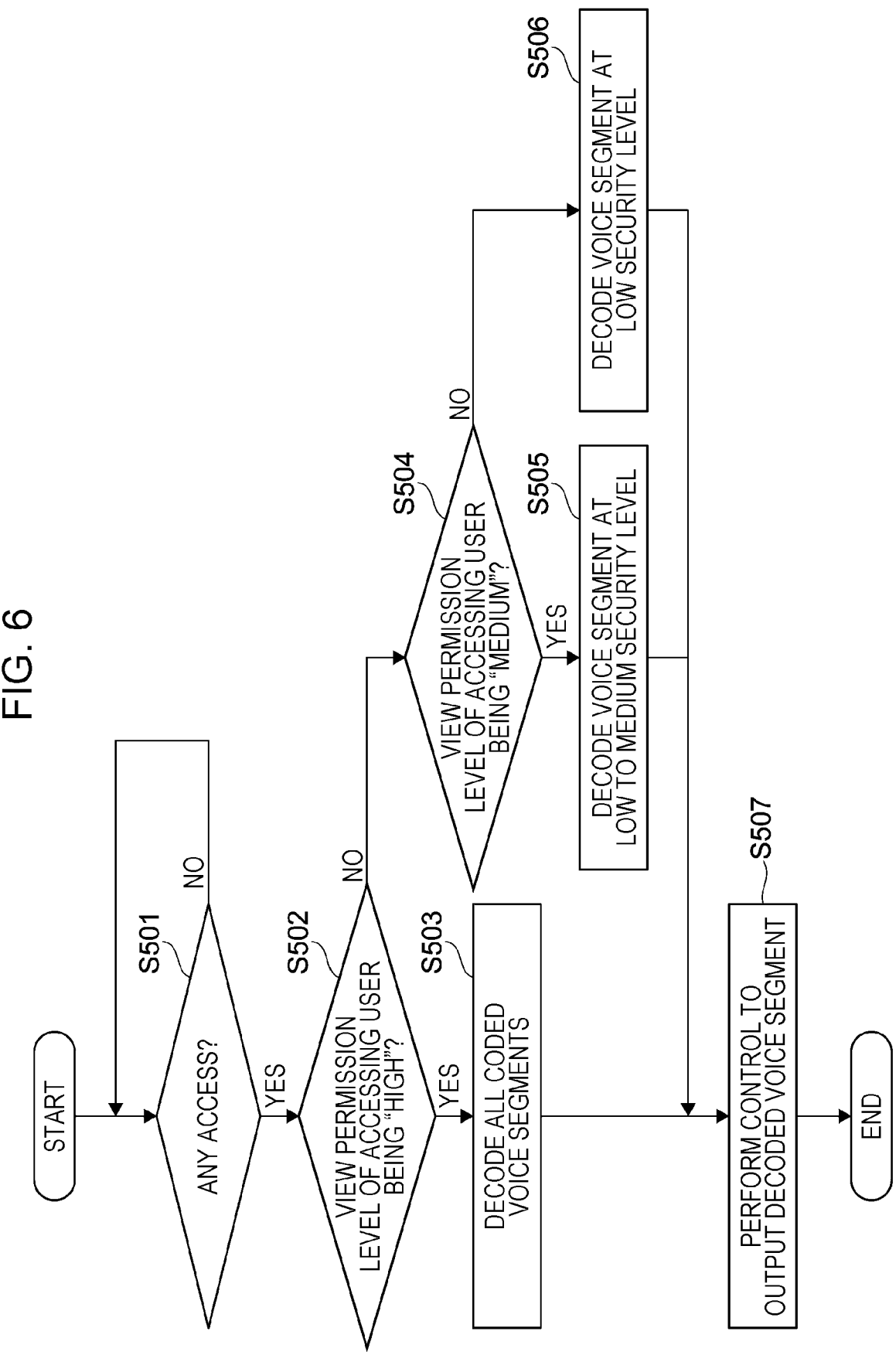
FIG. 6 is a flowchart illustrating a process flow of the management server when a user views the client terminal.

FIGS. 5 and 6 are flowcharts representing the process flow of the management server 10. FIG. 5 illustrates a coding process flow performed by the management server 10. If the voice data is received from the client terminal 30 (yes path in step S401), the management server 10 acquires the voice data (step S402) and converts the voice data into text (step S403). Specifically, the management server 10 generates the text data by performing voice recognition on the acquired voice data. If the voice data is not received from the client terminal 30 (no path in step S401), the management server 10 iterates the operation in step S401 until the voice data is received from the client terminal 30.

The management server 10 segments the generated text data into multiple voice segments (step S404) and, in response to the segmentation results, segments the voice data into multiple voice segments (step S405). The management server 10 imparts a security level to each voice segment (step S406) and codes each voice segment in accordance with the security level (step S407). The management server 10 thus ends the coding process.

FIG. 6 illustrates a process flow of the management server 10 when the user M views the client terminal 30. If there is an access from the client terminal 30 (yes path in step S501) and the accessing user M has a high view permission level (yes path in step S502), the management server 10 decodes all the coded voice segments (step S503). The management server 10 performs control to output the decoded voice segment (step S507). This causes the text data and voice data in all the voice segments to be viewable. If there is no access from the client terminal 30 (no path in step S501), the management server 10 iterates the operation in step S501 until there is an access from the client terminal 30.

If there is an access from the client terminal 30 (yes path in step S501) and the view permission level of the accessing user M is not high (no path in step S502) but medium (yes path in step S504), the management server 10 decodes the coded voice segments at the medium to low security level (step S505). The management server 10 performs control to output the decoded voice segment (step S507). In this way, the text data and voice data in the voice segment at the medium or low security level are viewable.

In contrast, if the view permission level of the accessing user M is neither high nor medium (no path in step S502 and no path in step S504), the management server 10 determines that the view permission level of the accessing user M is low and then decodes the voice segment at the low security level (step S506). The management server 10 controls the outputting of the decoded voice segment (step S507). The text data and voice data in the voice segment at the low security level are viewable and the process of the management server 10 thus ends.

Specific Example of Process

FIG. 7 illustrates the concept of visualized voice data serving as the coding process target of the management server 10. As described above, the voice data acquired by the management server 10 is converted into text and the text is then segmented into multiple voice segments. FIG. 7 illustrates the text data that is converted from the voice data and segmented into voice segments 1 through N (N is an integer equal to or higher than 3). Along with the segmentation of the text data, the voice data is also segmented into voice segments 1 through N. Each of the voice segments 1 through N is attached with tags 1 through N as the tag information and each of the tags 1 through N is imparted with the security level. For example, the tag 1, tag 2, and tag N are imparted with the security levels "low," "medium," and "high."

As described above, the management server 10 codes the text data and voice data in accordance with the security level on each voice segment and associates the decoding key with the voice segment in order to decode the coded text data and voice data. Referring to FIG. 7, a decoding key 3, decoding key 2, and decoding key 1 are associated with the voice segments to decode the coded text data in the voice segments 1 through N. Also, a decoding key C, decoding key B, and decoding key A are associated with the voice segments to decode the coded voice data in the voice segments 1 through N.

FIG. 8 illustrates a specific example of the voice segments that are respectively imparted with the security levels. Referring to FIG. 8, for example, if the contents of the text data and voice data in the voice segment are date, venue, participants, agenda of a meeting, etc., tag information "meeting information" is attached to the text data and voice data. The tag information is imparted with the low security level. This tag information is applicable to all meetings. For example, if the contents of the text data and voice data in the voice segment are sales, operation profit, mergers and acquisitions (M & A) information, etc., tag information "management information" is attached to the text data and voice data. The tag information is imparted with the high security level. The tag information is applicable to a management meeting.

For example, if the contents of the text data and voice data in the voice segment are persons to be evaluated in terms of human resources, performance review, placement of appointment, etc., tag information "personal information" is attached to the text data and voice data. The tag information is imparted with the high security level. The tag information is applicable to a management meeting, department management meeting, etc. For example, if the contents of the text data and voice data in the voice segment are a product name, development code, market introduction time, costs, etc., tag information "production information" is attached to the text data and voice data. The tag information is imparted with the high security level. For example, the tag information is applicable to a product planning meeting, development proposal meeting, decision review, etc.

For example, if the contents of the text data and voice data in the voice segment are a sales destination, scale of the sale, delivery schedule, etc., tag information "sales information" is attached to the text data and voice data. The tag information is imparted with a high security level. The tag information is applicable to a sales meeting. For example, if the contents of the text data and voice data in the voice segment are a personal name, birthday, address, etc., tag information "personal information" is attached to the text data and voice data. The tag information is imparted with the high security level. The tag information is applicable to a personnel meeting, etc.

For example, if the contents of the text data and voice data in the voice segment are a subject, tag information "subject" is attached to the text data and voice data. The tag information is imparted with the medium security level. The tag information is applicable to all meetings. For example, if the contents of the text data and voice data in the voice segment are an action item, person in charge, delivery, etc., tag information "ToDo" is attached to the text data and voice data. The tag information is imparted with the medium security level. The tag information is applicable to all meetings.

FIG. 9A illustrates a specific example of the view permission level imparted to each user M. Referring to FIG. 9A, users M1 through M3 as accessors access the text data and voice data stored on the management server 10. The user M1 is imparted beforehand with the high view permission level. The user M1 is thus granted decoding keys 1 through 3 for the text data and decoding keys A through C for the voice data in FIG. 7.

The M2 is imparted beforehand with the medium view permission level. The user M2 is thus granted decoding keys 2 and 3 for the coded text data and decoding keys B and C for the coded voice data in FIG. 7. The user M3 is imparted with the low view permission level. The user M3 is thus granted the decoding key 3 for the coded text data and the decoding key C for the coded voice data in FIG. 7.

FIG. 9B illustrates a specific example of the view permission level imparted to each user M and the security level imparted to each voice segment. Referring to FIG. 9B, the users M1 through M3 as accessors access the text data and voice data stored on the management server 10. The user M1 is imparted beforehand with the high view permission level. The user M1 is thus enabled to view the text data and voice data in all the voice segments.

The user M2 is imparted beforehand with the medium view permission level. The user M2 is thus enabled to view the text data and voice data in the voice segment at the low or medium security level. The user M3 is imparted beforehand with the low view permission level. The user M3 is thus enabled to view the text data and voice data in the voice segment at the low security level.

FIGS. 10 through 14 illustrate specific examples of screens displayed on the display 36 in the client terminal 30. FIG. 10 illustrates the specific example of a login screen as one of the screens displayed on the display 36 in the client terminal 30.

When the user M operates the client terminal 30 and accesses the text data and voice data on a meeting or the like stored on the database in the storage 13 in the management server 10, the login screen on the left hand side of FIG. 10 is first displayed on the client terminal 30. The user M first enters an "ID" and "password" in input boxes on the login screen and presses a button B1 denoted by "Log in." A screen illustrated on the right hand side of FIG. 10 is thus displayed. This screen displays the view permission level imparted beforehand to the user M. Referring to FIG. 10, the view permission level imparted beforehand to the user M is "high." The user M having performing a login operation may immediately recognize his or her own view permission level. The user M having recognized his or her own view permission level then presses a button B2 denoted by "Next."

FIG. 11 illustrates a specific example of a meeting selection screen as one of the screens displayed on the display 36 in the client terminal 30.

If the user M presses the button B2 denoted by "Next" in FIG. 10, a list of meetings with the text data and voice data thereof viewable to the user M is displayed in a selection-enabled fashion. Information on a name, date, venue, and participants of a meeting is illustrated as the list of meetings in FIG. 11. For example, the name of the meeting "Design review of product X" indicates that the date is Jan. 12, 2021, the venue is meeting room B in office A, and participants are Tanaka, Satoh, and 10 other persons.

The name of the meeting "Proposal of development start of product Y" indicates that the date is Jan. 18, 2021, the venue is meeting room C in head office, and participants are Suzuki, Mori and 8 other persons. The name of the meeting "Meeting on problem of product Z in market" indicates that the date is Jan. 18, 2021, the venue is meeting room D in office A, and participants are Yamada, Takahashi and 7 other persons.

Referring to FIG. 11, three meetings viewable to the user M are listed. The exemplary embodiment is not limited to three meetings. For example, by pressing a button B3 denoted by previous page or a button B4 denoted by next page, more meeting viewable to the user M are displayed. Also, referring to FIG. 11, the user M may search for a meeting according to a keyword. The user M having the high view permission level may now press a button B5 denoted by "View" on the right hand side of FIG. 11 to select the name of the meeting "Design review of product X". The client terminal 30 displays a meeting detail screen illustrated in FIG. 12.

FIG. 12 illustrates a specific example of the meeting detail screen as one of the screens displayed on the display 36 in the client terminal 30 held by the user M having the high view permission level.

When the user M having the high view permission level presses the button B5 denoted by "View" in FIG. 11 to select the name of the meeting "Design review of product X," the meeting detail screen in FIG. 12 is displayed. The meeting detail screen displays the security level of each voice segment of the meeting "Design review of product X," time elapsed from the start of the meeting, contents of the text data, and button B8 denoted by "Replay" to listen to the voice data. Since FIG. 12 illustrates the screen displayed on the client terminal 30 of the user M having the high view permission level, all the voice segments are displayed in a viewable state. The user M reads the text data and listens to the voice data as appropriate. It may be easier for the user M to recognize the feeling and the nuances of words of each participant that are typically difficult to recognize from the text data alone.

FIG. 12 illustrates a voice segment where the security level is "low," time elapsed from the start of the meeting is "0:00:00-0:01:23," contents of the text data are "Today is Jan. 12, 2021. Venue is meeting room B, office A. Participants are Tanaka, Satoh, . . . " FIG. 12 illustrates another voice segment where the security level is "high," time elapsed from the start of the meeting is "0:01:23-0:02:34," contents of the text data are "Since high strength is required of element C, material D is selected, and costs are targeted at E yens." FIG. 12 illustrates still another voice segment where the security level is "medium," time elapsed from the start of the meeting is "0:02:34-0:03:45," contents of the text data are "To Mr. F. Please study more on issue G and submit a report by next Wednesday."

FIG. 12 illustrates three voice segments viewable to the user M. The exemplary embodiment is not limited to the three voice segments. For example, more voice segments viewable to the user M may be displayed by pressing a button B6 denoted by "Previous page" and a button B7 denoted by "Next page." Referring to FIG. 12, the user M having the high view permission level is enabled to view the text data and voice data in all the voice segments without limitation.

FIG. 13 illustrates a specific example of the meeting detail screen as one of the screens displayed on the display 36 in the client terminal 30 held by the user M having the medium view permission level.

When the user M having the medium view permission level presses the button B5 denoted by "View" in FIG. 11 to select the name of the meeting "Design review of product X," the meeting detail screen in FIG. 13 is displayed. The meeting detail screen displays the security level of each voice segment of the meeting "Design review of product X," time elapsed from the start of the meeting, contents of the text data, and button B8 denoted "Replay" to listen to the voice data.

Since FIG. 13 illustrates the screen displayed on the client terminal 30 of the user M having the medium view permission level, the voice segment at the low or medium security level is displayed in a viewable fashion. Although the voice segment at the high security level is displayed on the meeting detail screen, the text data is masked with blur or black color and the voice data is not replayed even if the button B8 denoted by "Replay" is pressed. Alternatively, with a button "Replay disabled" (not illustrated) displayed, the voice data in the voice segment at the high security level may be set to not respond to an operation of the user M, such as a pressing operation.

FIG. 14 illustrates another specific example of the meeting detail screen as one of the screens displayed on the display 36 in the client terminal 30 held by the user M having the medium view permission level.

When the user M having the medium view permission level presses the button B5 denoted by "View" in FIG. 11 to select the name of the meeting "Design review of product X," the meeting detail screen in FIG. 14 is displayed. The meeting detail screen displays the security level of each voice segment of the meeting "Design review of product X," time elapsed from the start of the meeting, contents of the text data, and button B8 denoted "Replay" to listen to the voice data.

Since FIG. 14 illustrates the screen displayed on the client terminal 30 of the user M having the medium view permission level, the voice segment at the low or medium security level is displayed in a viewable fashion. In the voice segment at the high security level, unlike in FIG. 13, a portion of the text data is masked such that the portion is not visibly recognized.

All the text data in one voice segment may not necessarily be processed equally. For example, the text data may be masked by morpheme units. As described above, depending on the type of each of the morphemes forming a voice segment, the security level is imparted to the voice segment. In this case, a masked location is a valuable element of the text data in the voice segment. For example, the valuable element may be a proper noun related to privacy, such as a personal name or a company name, or a numerical value related to corporate secret, such as an address, date or price. The location of the voice data considered to be the valuable element is processed such that the location is not viewable. For example, the location considered to be the valuable element may be covered with silence or a noise sound, such as beep.

FIG. 15 illustrates a specific example of a disclosure destination range provided to each voice segment. Referring to FIG. 8, the specific example of the security level imparted to the tag information on each the voice segment is described. The tag information may also be associated with the disclosure destination range. The disclosure destination range, besides the view permission level, is a restriction that is imposed on a person who is permitted to view the text data and voice data in the voice segment.

Referring to FIG. 15, the disclosure destination range for the tag information "meeting information" is "All." This signifies that a person permitted to view the text data and voice data in the voice segment is subject to no restriction other than the view permission level. The disclosure destination range is a board member if the tag information is "management information." This signifies that a person permitted to view the text data and voice data in the voice segment is subject to the view permission level and limited to the user M who is a board member.

If the tag information is "personnel information," the disclosure destination range is "all members of personnel department and members of department operation." This signifies that a person permitted to view the text data and voice data in the voice segment is subject to the view permission level and limited to all members M belonging to the personnel department and members M of the department operation. If the tag information is "product information," the disclosure destination range is "all members of design department." This signifies that a person permitted to view the text data and voice data in the voice segment is subject to the view permission level and limited to all members M belonging to the design department.

If the tag information is "sales information," the disclosure destination range is "all members of sales department." This signifies that a person permitted to view the text data and voice data in the voice segment is subject to the view permission level and limited to all members M belonging to the sales department. If the tag information is "personal information," the disclosure destination range is "all members of personnel department and board members." This signifies that a person permitted to view the text data and voice data in the voice segment is subject to the view permission level and limited to members M belonging to the personnel department and members M being board members. If the tag information is "subject" or "ToDo," the disclosure destination range is "all." This signifies that a person permitted to view the text data and voice data in the voice segment is subject to no restriction other than the view permission level.

FIG. 16 illustrates a specific example of an organization that the user M belongs to and a role that is provided to the user M. Referring to FIG. 15, in addition to the view permission level, the disclosure destination range is illustrated as a restriction. The management server 10 manages, in an associated form as information on the user M, the view permission level, information on the organization that the user M belongs to, and information on the role that is provided to the user M. For example, these pieces of information may be acquired from a core system separately managed in a company.

FIG. 16 lists the view permission levels, departments, and posts of users M1 through M4 as accessors to the text data and voice data stored on the management server 10. For example, the view permission level of the user M1 is "high," the department of the user M1 is "design department," and the post of the user M1 is "manager." For example, the view permission level of the user M2 is "medium," the department of the user M2 is "personnel department," and the post of the user M2 is "general staff." For example, the view permission level of the user M3 is "low," the department of the user M3 is "sales department," and the post of the user M3 is "general staff." For example, the view permission level of the user M4 is "high," the department of the user M4 is "laboratory," and the post of the user M4 is "director of laboratory."

FIG. 17 illustrates a specific example of a non-disclosure time period imparted to each voice segment. Referring to FIG. 15, the disclosure destination range is additionally imparted to the tag information on a per voice segment basis. In addition, a non-disclosure time period may also be associated with the tag information. The non-disclosure time period signifies a time period throughout which the text data and voice data in the voice segment are not viewable. After the elapse of the non-disclosure time period, all users M are enabled to view the text data and voice data.

Referring to FIG. 17, if the tag information is "meeting information," the non-disclosure time period is "Not applicable." This signifies that no restriction is imposed on the time period throughout which the text data and voice data in the voice segment are viewable. If the tag information is "management information," the non-disclosure time period is "2 years." This signifies that all users M are enabled to view the text data and voice data after the elapse of 2 years of the non-disclosure time period.

If the tag information is "personnel information," the non-disclosure time period is "3 years." This signifies that all users M are enabled to view the text data and voice data after the elapse of 3 years of the non-disclosure time period. If the tag information is "product information," the non-disclosure time period is "2 years." This signifies that all users M are enabled to view the text data and voice data after the elapse of 2 years of the non-disclosure time period. If the tag information is "sales information," the non-disclosure time period is "1 year." This signifies that all users M are enabled to view the text data and voice data after the elapse of 1 year of the non-disclosure time period.

If the tag information is "personal information," the non-disclosure time period is "indefinite period." This signifies that the non-disclosure time period is indefinite and the user M is not enabled to view the text data and voice data even after the elapse of any time period. If the tag information is "subject," the non-disclosure time period is "not applicable." This signifies that no restriction is imposed on the time period throughout which the user M is enabled to view the text data and voice data in the voice segment. If the tag information is "ToDo," the non-disclosure time period is "1 year." This signifies that all users M are enabled to view the text data and voice data after the elapse of 1 year of the non-disclosure time period.

The exemplary embodiment has been described above. The disclosure is not limited to the exemplary embodiment. The effect of the disclosure is not limited to the effect of the exemplary embodiment. The system configuration in FIG. 1 and the hardware configuration in FIGS. 2 and 3 have been described for exemplary purposes only and the disclosure is not limited to the system configuration in FIG. 1 and the hardware configuration in FIGS. 2 and 3. The functional configuration in FIG. 4 has been also described for exemplary purposes and the disclosure is not limited to the functional configuration in FIG. 4. It may be sufficient if the information processing system 1 in FIG. 1 has a function that executes the above-described process. The functional configuration to execute the function is not limited to the functional configuration in FIG. 4. According to the exemplary embodiment, the management server 10 decodes the coded text data and voice data. Alternatively, the client terminal 30 may decode the coded text data and voice data.

The order of steps of the process in FIGS. 5 and 6 have been described for exemplary purposes only. The disclosure is not limited to the order of steps of the process described above. The process may be performed in the order of steps in time sequence as illustrated in FIGS. 5 and 6. Alternatively, the steps may be performed in parallel or separately. The screens in FIGS. 10 through 14 have been described for exemplary purposes only. The disclosure is not limited to the screens in FIGS. 10 through 14. The client terminal 30 may be caused to display a user interface that is configured to select the text data and voice data by voice segment units and cause the selected voice segment of the text data and voice data to be viewable.

According to the exemplary embodiment, the use of three security levels, "high," "medium," and "low" imparted to the tag information in the voice segment has been described for exemplary purposes only. Any type of security level indicative of a degree of confidentiality may be employed. For example, three security levels of "A," "B," and "C" may be employed. Five security levels of "1" through "5" may be employed. According to the exemplary embodiment, a single view permission level is imparted to a single user M. The disclosure is not limited to this setting. For example, on a per department basis, the security level may be imparted to a department that the user M belongs to or a role that is provided to the user M. In such a case, the security level may be displayed on a per department basis on the right screen in FIG. 10.

According to the exemplary embodiment, the coding and decoding are performed as the controlling of the output of the text data and voice data in the voice segment. The disclosure is not limited to this configuration. A variety of operations may be employed to control the permission as to whether to allow the text data and voice data to be viewed. For example, without coding or decoding the text data and voice data, the user interface may be configured to not display a replay button for the voice data, or not accept the pressing of the replay button, or cause a location of the text data to be blacked out or masked. In this way, the viewing of the text data and voice data is controlled.

According to the exemplary embodiment, the security level is imparted to each voice segment. Alternatively, the security level may be imparted to each of the morphemes forming the voice segment.

The tag information in FIG. 8 has been described for exemplary purposes only. The security level imparted to the tag information "meeting information" is low. Alternatively, the security level may be classified as follows: meetings for an executive level may be classified as "meeting information (1)", meetings for teams may be classified as "meeting information (2)", meetings for departments may be classified as "meeting (3)." In this case, the meeting may be hierarchically classified as follows: the meeting (1) is at a high security level, the meeting (2) is at a medium security level, and the meeting (3) is at a low security level.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor configured to:
   receive data;
   segment, from the data, into a plurality of voice segments, wherein a voice segment of the plurality of voice segments comprises a voice data of the voice segment and a text data of the voice segment;
   impart a security level to each of the voice segments in accordance with contents of the text data and the voice data in each of the voice segments; and
   perform control on an output of each of the voice segments in accordance with the security level, wherein
   the processor is configured to segment from the data into the plurality of the voice segments, each of the plurality of voice segments comprising a voice data and a text data, in accordance with machine learning or natural language processing and by estimating a change of subjects emitting voices in accordance with information on a change in features of the voices obtained from the voice data of each of the plurality of voice segments.

2. The information processing apparatus according to claim 1, wherein the processor is configured to impart the security level to each of the plurality of voice segments in accordance with a type, serving as the contents, of each of a plurality of morphemes forming each of the voice segments.

3. The information processing apparatus according to claim 2, wherein the processor is configured to, in accordance with the security level, perform control on the output of each of the plurality of voice segments or each of the plurality of morphemes.

4. The information processing apparatus according to claim 3, wherein the processor is configured to cause a location of a morpheme, included in the text data and the voice data, to be output in a predetermined output format in the control of the output.

5. The information processing apparatus according to claim 2, wherein the processor is configured to, if the type of the morpheme is a proper noun or a numerical value representing predetermined contents, impart a higher security level to a voice segment including the morpheme than other voice segments.

6. The information processing apparatus according to claim 1,
wherein the processor is configured to impart to each of the plurality of voice segments a security level determined beforehand on each type of the contents.

7. The information processing apparatus according to claim 6, wherein the processor is configured to set beforehand the security level to tag information representing the type of the contents.

8. The information processing apparatus according to claim 1, wherein the processor is configured to:
associate the security level with a decoding key that decodes a coded voice segment to render the decoded voice segment viewable in the control of the output; and
grant a user having accessed the text data and the voice data the decoding key in accordance with a permission level of the user.

9. The information processing apparatus according to claim 8, wherein the processor is configured to grant the user the decoding key in accordance with a predetermined range of users.

10. The information processing apparatus according to claim 8, wherein the processor is configured to grant the user the decoding key in accordance with an organization that the user belongs to and/or a role that is provided to the user.

11. The information processing apparatus according to claim 8, wherein the processor is configured to grant the user the decoding key in accordance with a predetermined time period.

12. The information processing apparatus according to claim 8, wherein the processor is configured to, if the user that is granted the decoding key has accessed the information processing apparatus, perform control to output the text data and/or the voice data in a voice segment corresponding to the decoding key.

13. An information processing system comprising:
a communication transceiver configured to receive data; and
a processor configured to:
segment, from the data, into a plurality of voice segments, wherein a voice segment of the plurality of voice segments comprises a voice data of the voice segment and a text data of the voice segment;
impart a security level to each of the voice segments in accordance with contents of the text data and the voice data in each of the voice segments; and
perform control on an output of each of the voice segments in accordance with the security level, wherein
the processor is configured to segment from the data into the plurality of the voice segments, each of the plurality of voice segments comprising a voice data and a text data, in accordance with machine learning or natural language processing and by estimating a change of subjects emitting voices in accordance with information on a change in features of the voices obtained from the voice data of each of the plurality of voice segments.

14. A non-transitory computer readable medium storing a program causing a computer comprising a processor to execute a process, the process executed by the processor comprising:
receiving data;
segmenting, from the data, into a plurality of voice segments, wherein a voice segment of the plurality of voice segments comprises a voice data and a text data of the voice segment;
imparting a security level to each of the voice segments in accordance with contents of the text data and the voice data in each of the voice segments; and
performing control on an output of each of the voice segments in accordance with the security level, wherein
segmenting from the data into the plurality of the voice segments, each of the plurality of voice segments comprising a voice data and a text data, is in accordance with machine learning or natural language processing and by estimating a change of subjects emitting voices in accordance with information on a change in features of the voices obtained from the voice data of each of the plurality of voice segments.

* * * * *